US012054389B2

(12) United States Patent
Albuali et al.

(10) Patent No.: US 12,054,389 B2
(45) Date of Patent: Aug. 6, 2024

(54) CATALYSTS CONTAINING RED MUD AND RHODIUM FOR DRY REFORMING

(71) Applicant: Saudi Arabian Oil Company, Dhahran (SA)

(72) Inventors: Mohammed A. Albuali, Dammam (SA); Nawal Saad Alhajri, Dammam (SA); Samar Arjah, Dhahran (SA); Bandar A. Fadhel, Dhahran (SA); Rami Bamagain, Al Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/670,606

(22) Filed: Feb. 14, 2022

(65) Prior Publication Data
US 2023/0257264 A1 Aug. 17, 2023

(51) Int. Cl.
C01B 3/40 (2006.01)
B01J 23/00 (2006.01)
B01J 23/46 (2006.01)
B01J 35/61 (2024.01)
B01J 37/00 (2006.01)
B01J 37/03 (2006.01)
B01J 37/04 (2006.01)
B01J 37/08 (2006.01)

(52) U.S. Cl.
CPC .............. C01B 3/40 (2013.01); B01J 23/002 (2013.01); B01J 23/464 (2013.01); B01J 35/613 (2024.01); B01J 35/615 (2024.01); B01J 37/009 (2013.01); B01J 37/031 (2013.01); B01J 37/04 (2013.01); B01J 37/082 (2013.01); C01B 2203/0238 (2013.01); C01B 2203/1064 (2013.01); C01B 2203/1241 (2013.01)

(58) Field of Classification Search
CPC .............. C01B 3/40; C01B 2203/1241; C01B 2203/0238; C01B 2203/1064; B01J 23/002; B01J 23/464; B01J 37/009; B01J 37/031; B01J 37/04; B01J 37/082; B01J 35/1014; B01J 35/1019
See application file for complete search history.

(56) References Cited

U.S. PATENT DOCUMENTS 10,179,326 B2    1/2019   Basset et al.
11,059,720 B1    7/2021   Fadhel et al.
2005/0096215 A1* 5/2005   Espinoza .............. B01J 23/10
                                              502/240

(Continued)

FOREIGN PATENT DOCUMENTS

AU    2017306504 B2 *  5/2020  .............. B01J 21/10

OTHER PUBLICATIONS

Sushil et al. Applied Catalysis B Environmental 2008, 81, 64-77 (Year: 2008).*

(Continued)

Primary Examiner — Sally A Merkling
Assistant Examiner — Jordan W Taylor
(74) Attorney, Agent, or Firm — Fish & Richardson P.C.

(57) ABSTRACT

Catalyst compositions containing red mud and rhodium are provided. An exemplary catalyst composition includes about 50 wt % to about 99 wt % of a mixed-oxide material including iron oxide, aluminum oxide, and silicon oxide, and about 1 wt % to about 40 wt % of rhodium oxide, calculated as $Rh_2O_3$.

25 Claims, 5 Drawing Sheets

(56) References Cited

U.S. PATENT DOCUMENTS

2021/0229072 A1    7/2021   Alsolami et al.
2021/0229074 A1*   7/2021   Alsolami ............... B01J 37/009

OTHER PUBLICATIONS

Bhat et al. Applied Catalysis A General, 1997, 150, 279-296 (Year: 1997).*
Snars et al. Applied Clay Science 2009, 46, 13-20 (Year: 2009).*
Cao et al. Catal. Sci. Technol. 2014, 4, 361 (Year: 2014).*
Takami et al. Catal. Sci. Technol., 2020, 10, 5811-5814 (Year: 2020).*

* cited by examiner

100

CATALYSTS CONTAINING RED MUD AND RHODIUM FOR DRY REFORMING

TECHNICAL FIELD

The present disclosure relates to catalyst compositions containing red mud and rhodium.

BACKGROUND

With the constant growth of the world population, waste management has become a significant challenge. One example is the storage of industrial hazardous wastes such as red mud. Red mud is a by-product of alumina production using the Bayer process, which is the source of more than 95% of alumina produced globally. For each ton of alumina produced, 1 to 2 tons of red mud, also referred to as bauxite tailings, are generated. As a consequence, more than 100 million tons of red mud are generated annually, and billions of tons of red mud are stored worldwide. Typical disposal and storage methods for red mud include marine disposal, lagooning, dry stacking, and dry cake disposal. However, solutions of red mud can be highly alkaline, having a pH ranging from 10 to 13. Further, red mud has a considerable metal content and, accordingly, represents a danger to the environment.

SUMMARY

An embodiment described herein provides a catalyst composition including about 50 wt % to about 99 wt % of a mixed-oxide material including iron oxide, aluminum oxide, and silicon oxide, and about 1 wt % to about 40 wt % of rhodium oxide, calculated as $Rh_2O_3$.

An embodiment described herein provides a method for preparing a catalyst composition. The method includes contacting a mixed-oxide material including iron oxide, aluminum oxide, and silicon oxide with an acid to form an acid-treated support, precipitating a mixture of the acid-treated support and rhodium to form a precursor composition, and calcining the precursor composition to form the catalyst composition.

An embodiment described herein provides a method for dry reforming methane. The method includes contacting methane and carbon dioxide with a catalyst composition including about 50 wt % to about 99 wt % of a mixed-oxide material including iron oxide, aluminum oxide, and silicon oxide, and about 1 wt % to about 40 wt % of rhodium oxide, calculated as $Rh_2O_3$, to form $H_2$ and CO.

DETAILED DESCRIPTION

Figure 1:
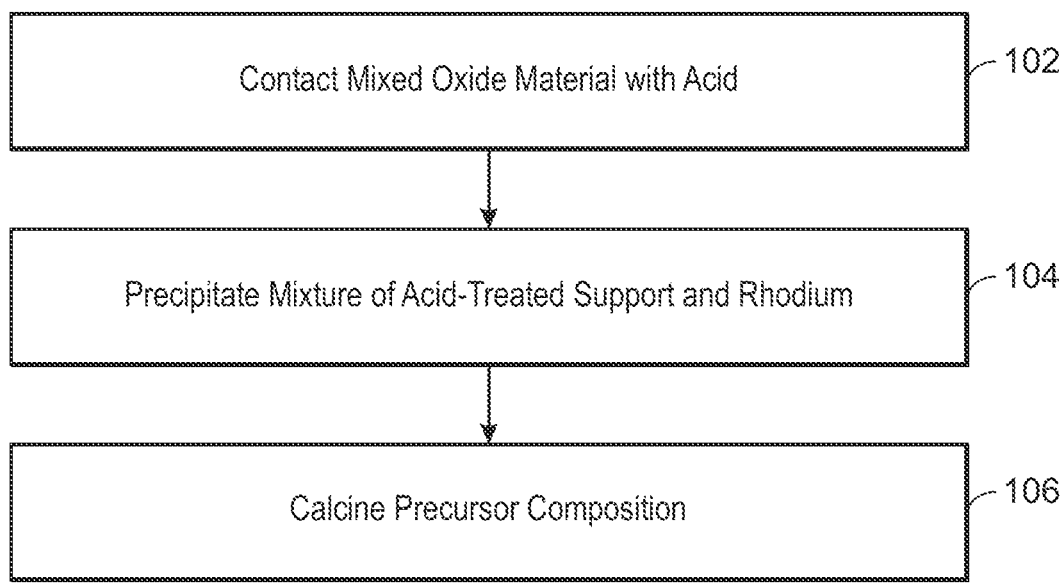
FIG. 1 is a process flow diagram of a method for preparing a catalyst composition.

The present disclosure relates to catalyst compositions including rhodium oxide and a mixed-oxide material containing iron oxide, aluminum oxide, and silicon oxide as listed in table 1, to methods for making the catalyst compositions, and to dry reforming methods using the catalyst compositions. In some embodiments, the mixed-oxide material is red mud or a derivative thereof. The catalyst compositions of the present disclosure, for example, including rhodium oxide supported on acid-treated red mud, can exhibit a significantly greater specific surface area as compared to untreated red mud. The catalyst compositions of the present disclosure can be useful in a dry reforming process for converting $CH_4$ and $CO_2$ to $H_2$ and CO. The catalyst compositions of the present disclosure can also exhibit improved catalytic activity over time in a dry reforming process.

As described in the present disclosure, red mud, which includes different metal oxides such as $Fe_2O_3$, $Al_2O_3$, $SiO_2$, $Na_2O$, CaO, and $TiO_2$, is a promising catalyst support for dry reforming, and modifying red mud with Rh can significantly improve its catalytic activity towards methane dry reforming. Table 1, below, shows an exemplary composition of global red mud.

TABLE 1

| Exemplary Global Red Mud (untreated) | | | | | |
| --- | --- | --- | --- | --- | --- |
| Component | $Fe_2O_3$ | $Al_2O_3$ | $SiO_2$ | $Na_2O$ | CaO | $TiO_2$ |
| Percentage | 30-60% | 10-20% | 3-50% | 2-10% | 2-8% | 10% |

Catalyst Compositions

Provided in this disclosure are catalyst compositions including about 50 wt % to about 99 wt % of a mixed-oxide material containing iron oxide, aluminum oxide, and silicon oxide, and about 1 wt % to about 40 wt % of rhodium oxide, calculated as $Rh_2O_3$. In some embodiments, the mixed-oxide material contains red mud from a process for extracting alumina from bauxite, for example, containing oxides of iron, aluminum, and silicon, and optionally oxides of one or more of titanium, calcium, and sodium.

The mixed-oxide material can include about 5 wt % to about 60 wt %, such as about 5 wt % to 50 wt %, or about 5 wt % to about 40 wt %, or about 15 wt % to about 60 wt %, or about 15 wt % to about 50 wt %, or about 15 wt % to about 40 wt %, or about 30 wt % to about 60 wt %, or about 30 wt % to about 50 wt %, or about 30 wt % to about 40 wt % of iron oxide, calculated as $Fe_2O_3$. The mixed-oxide material can include about 5 wt % to about 30 wt %, such as about 5 wt % to about 25 wt %, or about 5 wt % to about 20 wt %, or about 10 wt % to about 30 wt %, or about 10 wt % to about 25 wt %, or about 10 wt % to about 20 wt %, or about 15 wt % to about 30 wt %, or about 15 wt % to about 25 wt %, or about 15 wt % to about 20 wt % of aluminum oxide, calculated as $Al_2O_3$. The mixed-oxide material can include about 3 wt % to about 50 wt %, such as about 3 wt % to about 40 wt %, or about 3 wt % to about 30 wt %, or about 5 wt % to about 50 wt %, or about 5 wt % to about 40 wt %, or about 5 wt % to about 30 wt %, or about 10 wt % to about 50 wt %, or about 10 wt % to about 40 wt %, or about 10 wt % to about 30 wt % of silicon oxide, calculated as $SiO_2$. For example, in some embodiments, the mixed-oxide material contains about 5 wt % to about 60 wt % of iron oxide, calculated as $Fe_2O_3$, about 5 wt % to about 30 wt % of aluminum oxide, calculated as $Al_2O_3$, and about 3 wt % to about 50 wt % of silicon oxide, calculated as $SiO_2$.

In some embodiments, the mixed-oxide material further contains one or more of sodium oxide, calcium oxide, and titanium oxide. In various examples, the mixed-oxide material contains up to about 15 wt %, such as about 0 wt % to about 15 wt %, or about 0 wt % to about 12.5 wt %, or about 0 wt % to about 10 wt %, or about 2.5 wt % to about 15 wt %, or about 2.5 wt % to about 12.5 wt %, or about 2.5 wt % to about 10 wt %, or about 5 wt % to about 15 wt %, or about 5 wt % to about 12.5 wt %, or about 5 wt % to about 10 wt % of titanium oxide, calculated as $TiO_2$. In various examples, the mixed-oxide material contains up to about 14 wt %, such as about 0 wt % to about 14 wt %, or about 0 wt % to about 11 wt %, or about 0 wt % to about 8 wt %, or about 2 wt % to about 14 wt %, or about 2 wt % to about 11 wt %, or about 2 wt % to about 8 wt %, or about 4 wt % to about 14 wt %, or about 4 wt % to about 11 wt %, or about 4 wt % to about 8 wt % of calcium oxide, calculated as CaO. In various examples, the mixed-oxide material contains up to about 10 wt %, such as about 0 wt % to about 10 wt %, or about 0 wt % to about 9 wt %, or about 0 wt % to about 8 wt %, or about 2 wt % to about 10 wt %, or about 2 wt % to about 9 wt %, or about 2 wt % to about 8 wt %, or about 4 wt % to about 10 wt %, or about 4 wt % to about 9 wt %, or about 4 wt % to about 8 wt % of sodium oxide, calculated as $Na_2O$.

In some embodiments, the catalyst composition contains about 5 wt % to about 30 wt, such as about 5 wt % to about 25 wt %, or about 5 wt % to about 20 wt %, or about 10 wt % to about 30 wt %, or about 10 wt % to about 25 wt %, or about 10 wt % to about 20 wt %, or about 15 wt % to about 30 wt %, or about 15 wt % to about 25 wt %, or about 15 wt % to about 20 wt % of rhodium oxide, calculated as $Rh_2O_3$. In an example, the catalyst composition contains about 19 wt % of rhodium oxide, calculated as $Rh_2O_3$. In certain examples, the catalyst composition contains about 70 wt % to about 95 wt %, such as about 70 wt % to about 90 wt %, or about 70 wt % to about 85 wt %, or about 75 wt % to about 95 wt %, or about 75 wt % to about 90 wt %, or about 75 wt % to about 85 wt %, or about 80 wt % to about 95 wt %, or about 80 wt % to about 90 wt %, or about 80 wt % to about 85 wt % of the mixed-oxide material. In an example, the catalyst composition contains about 85 wt % of the mixed-oxide material.

In some embodiments, the mixed-oxide material and rhodium oxide make up at least about 90 wt %, for example, at least about 92.5 wt %, or at least about 95 wt %, or at least about 97.5 wt %, or at least about 99 wt % of the catalyst composition. In an example, the catalyst composition includes at least about 95 wt %, such as at least about 97.5 wt %, or at least about 99 wt %, of rhodium oxide and red mud from a process for extracting alumina from bauxite.

In some embodiments, the rhodium oxide is supported on the mixed-oxide material. Such supported rhodium catalyst compositions can be prepared, for example, by impregnating a mixed-oxide material such as red mud with rhodium, and then calcining the impregnated composition, or by precipitating a mixture of rhodium and a mixed-oxide material such as red mud, and then calcining the precipitated composition.

In some embodiments, the Brunauer-Emmett-Teller (BET) surface area, also referred to in this disclosure as specific surface area, of the catalyst composition is at least about 90 m²/g. In various examples, the BET surface area of the catalyst composition is at least about 100 m²/g, or at least about 110 m²/g, or at least about 125 m²/g, such as about 125 m²/g to about 200 m²/g, or about 125 m²/g to about 190 m²/g, or about 125 m²/g to about 180 m²/g, or about 135 m²/g to about 200 m²/g, or about 135 m²/g to about 190 m²/g, or about 135 m²/g to about 180 m²/g, or about 145 m²/g to about 200 m²/g, or about 145 m²/g to about 190 m²/g, or about 145 m²/g to about 180 m²/g. In an example, the BET surface area of the catalyst composition is about 165 m²/g.

Methods for Preparing Catalyst Compositions

Provided in this disclosure are methods for preparing the catalyst compositions of the present disclosure. The methods include contacting a mixed-oxide material containing iron oxide, aluminum oxide, and silicon oxide with an acid to form an acid-treated support, precipitating a mixture of the acid-treated support and rhodium to form a precursor composition, and calcining the precursor composition to form the catalyst composition. In some embodiments, the methods include contacting red mud from a process for extracting alumina from bauxite with an acid to form the acid-treated support. In various examples, the catalyst compositions formed by the preparation methods of the present disclosure can have a BET surface area of at least about 90 m²/g, for example, at least about 125 m²/g, or at least about 140 m²/g, or at least about 150 m²/g, or at least about 160 m²/g.

In some embodiments, contacting the mixed-oxide material with an acid includes adding the acid to an aqueous solution including the mixed-oxide material, for example, red mud. In an example, the acid contains hydrochloric acid, such as aqueous hydrochloric acid having a concentration of about 1 wt % to about 10 wt %. Treating the mixed-oxide material can increase the specific surface area of a mixed-oxide material such as red mud, for example, from less than about 20 m²/g to greater than 140 m²/g. In an example, contacting the mixed-oxide material with an acid forms an acid-treated support having a BET surface area of at least about 140 m²/g, such as at least about 150 m²/g, or at least about 160 m²/g.

In some embodiments, precipitating the mixture of the acid-treated support and rhodium includes adding a base to an aqueous solution containing the acid-treated support and a rhodium salt. In an example, the base contains ammonia, such as aqueous ammonia. The rhodium salt can be, for example, rhodium acetylacetonate, rhodium chloride, or rhodium sulfate. In various examples, adding base to the aqueous solution of acid-treated support and rhodium salt can increase the pH of the solution greater than 8, for example, to about 9.

In some embodiments, the method includes filtering the precursor composition, drying the filtered precursor composition, and then calcining the dried precursor composition. In an example, the filtered precursor composition is dried at about 50° C. to about 150° C., for example, for about 1 hour to about 24 hours, and then calcined at about 350° C. to about 650° C., for example, for about 1 hour to about 12 hours.

Dry Reforming Methods

Provided in this disclosure are methods for dry reforming methane using the catalyst compositions of the present disclosure to form $H_2$ and CO. The methods include contacting $CH_4$ and $CO_2$ with a catalyst composition containing about 50 wt % to about 99 wt % of a mixed-oxide material containing iron oxide, aluminum oxide, and silicon oxide, and about 1 wt % to about 40 wt % of rhodium oxide, calculated as $Rh_2O_3$. In various examples, the dry reforming methods of the present disclosure can exhibit improved methane conversion and hydrogen production as compared to dry reforming methods using untreated red mud. In an example, the methane conversion of the dry reforming methods can increase over time, for example, from about 25% to about 35%, after about 6 hours of dry reforming. In another example, the hydrogen production of the dry reforming methods can increase over time, for example, from about 13 wt % to about 21 wt %, after about 5 hours of dry reforming.

The contacted catalyst composition can be any catalyst composition of the present disclosure, such as a catalyst composition including red mud from a process for extracting alumina from bauxite. In some embodiments, the contacted catalyst composition has a BET surface area of at least about 90 m$^2$/g, for example, at least about 125 m$^2$/g, or at least about 140 m$^2$/g, or at least about 150 m$^2$/g, or at least about 160 m$^2$/g.

In some embodiments, the dry reforming methods include contacting $CH_4$ and $CO_2$ with the catalyst composition at a temperature of about 500° C. to about 1,000° C., for example, about 650° C. to about 900° C. In some embodiments, the dry reforming methods include contacting $CH_4$ and $CO_2$ with the catalyst composition at a pressure of about 5 bar to about 20 bar, for example, about 10 bar to about 18 bar. In some embodiments, the dry reforming methods include contacting $CH_4$ and $CO_2$ with the catalyst composition at a gas hourly space velocity (GHSV) of about 1,000 h$^{-1}$ to about 10,000 h$^{-1}$, for example, about 1,000 h$^{-1}$ to about 5,000 h$^{-1}$. In an example, the catalyst can be contacted with $CH_4$ and $CO_2$ at a temperature of about 750° C., a pressure of about 14 bar, and a GHSV of about 1,500 h$^{-1}$.

FIG. 1 is a process flow diagram of a method 100 for preparing a catalyst composition. The method starts at block 102 with the contacting of a mixed-oxide material containing iron oxide, aluminum oxide, and silicon oxide with an acid to form an acid-treated support. At block 104, a mixture of the acid-treated support and rhodium is precipitated to form a precursor composition. At block 106, the precursor composition is calcined to form the catalyst composition.

Figure 2:
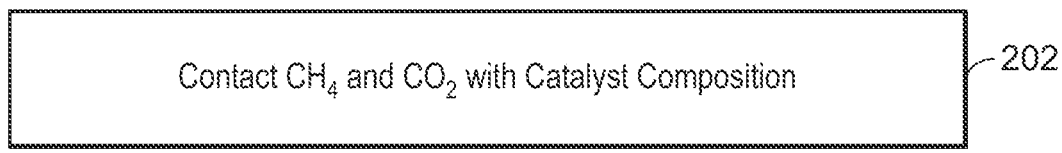
FIG. 2 is a process flow diagram of a method for dry reforming methane.

FIG. 2 is a process flow diagram of a method 200 for dry reforming methane. The method includes, at block 202, contacting methane and carbon dioxide with a catalyst composition containing about 50 wt % to about 99 wt % of a mixed-oxide material containing iron oxide, aluminum oxide, and silicon oxide, and about 1 wt % to about 40 wt % of rhodium oxide, calculated as $RH_2O_3$, to form $H_2$ and carbon monoxide.

EXAMPLES

Example 1—Catalyst Preparation

A red mud solution was prepared by dissolving 10 g of dry red mud, having a BET surface area of about 16 m$^2$/g, in 100 mL deionized water. An acid solution was prepared by mixing 0.5 mL of 37% hydrochloric acid with 359.5 ml deionized water. The red mud solution and acid solution were mixed, to promote the textural properties of the red mud. A rhodium solution was prepared by dissolving 5.88 g of rhodium acetylacetonate in 60 mL chloroform. Then, these two solutions were mixed, and a precursor material was precipitated by slowly adding aqueous ammonia while stirring, until the pH of the mixture reached 9. The precipitate was filtered, dried in an oven at 100° C., and then calcined at 550° C. for 4 hours to form catalyst 1, including about 18.6 wt % rhodium oxide, calculated as $Rh_2O_3$ (about 15.1 wt %, calculated as elemental Rh) and having a BET surface area of about 165 m$^2$/g.

Figure 3:
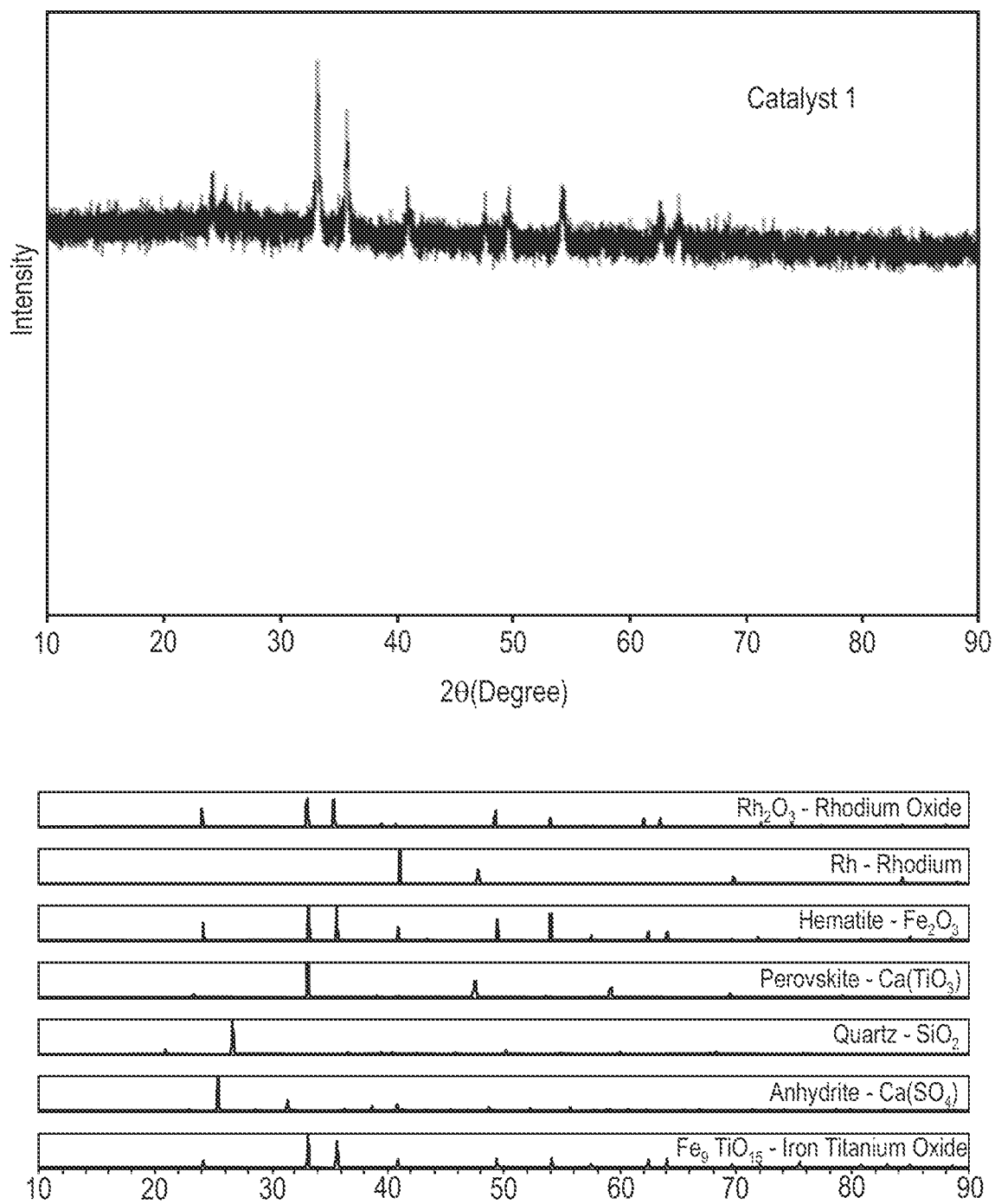
FIG. 3 is a set of plots showing the XRD pattern and the decomposed phases thereof, of a catalyst composition including rhodium oxide and acid-treated red mud.

FIG. 3 shows the decomposed phases of an XRD pattern of catalyst 1. As can be seen in FIG. 3, the major phase was $Rh_2O_3$, in addition to the mixture of oxides already present in red mud, such as hematite, perovskite, and quartz.

Example 2—Dry Reforming

Catalyst 1 prepared according to Example 1 was evaluated in a dry reforming process. The results were also compared to a comparative sample C of untreated red mud. The dry reforming process was conducted at a temperature of 750° C., a pressure of 14 bar, and a gas hourly space velocity (GHSV) of 1477 h$^{-1}$, for 8 hours. Methane conversion and hydrogen production of the process are shown in FIGS. 4 and 5, respectively.

Figure 4:
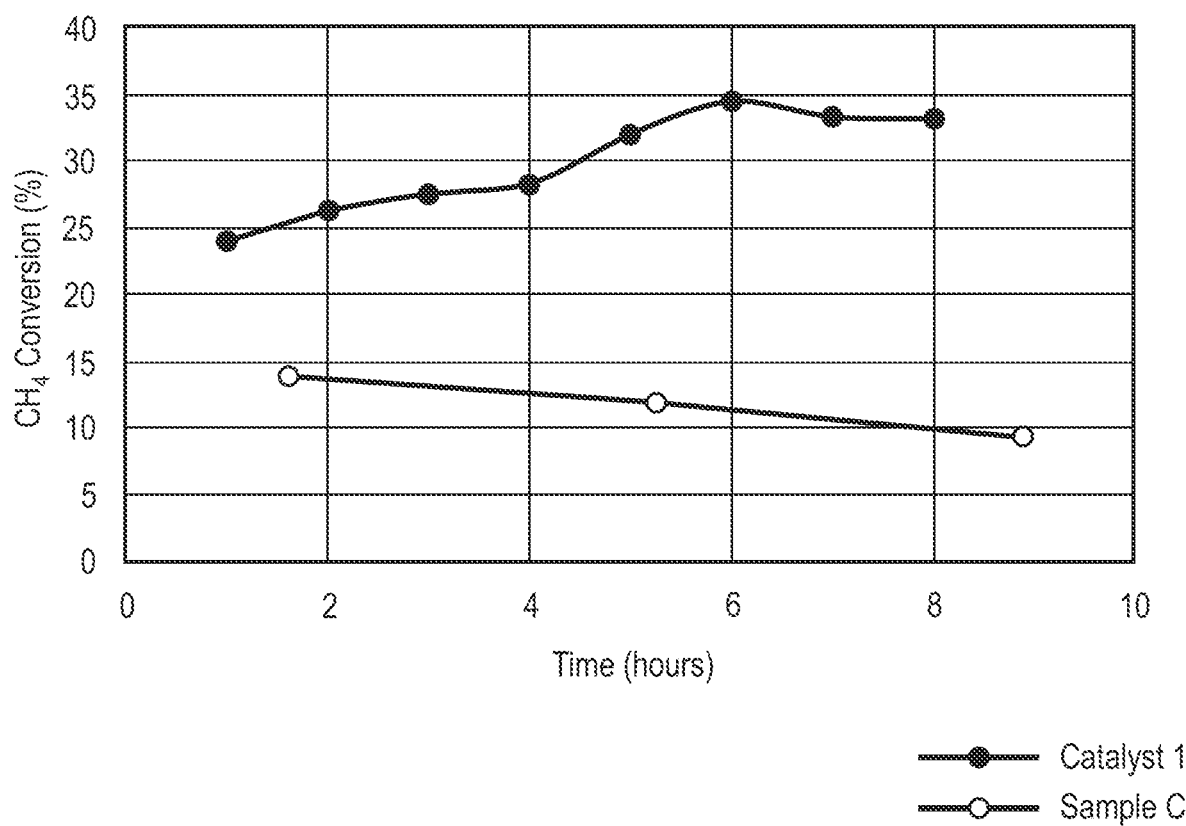
FIG. 4 is a graph showing $CH_4$ conversion over time for a dry reforming process using a catalyst composition including rhodium oxide and acid-treated red mud, and a comparative sample including untreated red mud.

As shown in FIG. 4, catalyst 1 exhibited improved methane conversion as compared to sample C. Methane conversion by catalyst 1 reached 35%, and remained relatively constant around this level over the course of the experiment. In contrast, methane conversion by sample C only reached 15%, and then deteriorated. Without being bound by theory, the slight conversion activity of sample C, along with at least part of the high conversion of catalyst 1, could be attributed at least in part to the presence of transition metals in red mud.

Figure 5:
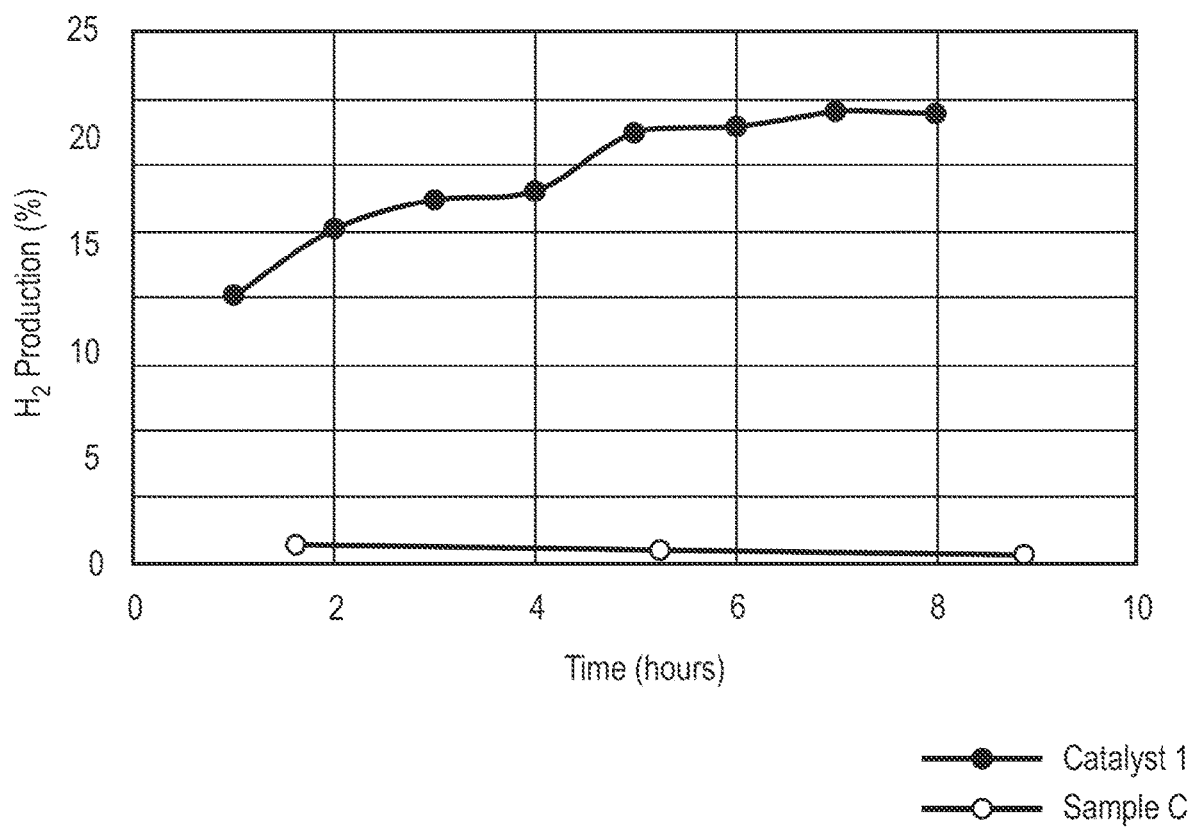
FIG. 5 is a graph showing $H_2$ production over time for a dry reforming process using a catalyst composition including rhodium oxide and acid-treated red mud, and a comparative sample including untreated red mud.

As shown in FIG. 5, sample C produced very little $H_2$, whereas catalyst 1 exhibited $H_2$ production of up to 21%. These results demonstrate the positive effect of the modifications of red mud with acid and rhodium for dry reforming of methane.

The results also demonstrate that catalyst 1 was tolerant to high pressure, which is favorable for industrial dry reforming processes.

Definitions

Unless otherwise defined, all technical and scientific terms used in this document have the same meaning as commonly understood by one of ordinary skill in the art to which the present application belongs. Methods and materials are described in this document for use in the present application; other, suitable methods and materials known in the art can also be used. The materials, methods, and examples are illustrative only and not intended to be limiting. All publications, patent applications, patents, sequences, database entries, and other references mentioned in this document are incorporated by reference in their entirety. In case of conflict, the present specification, including definitions, will control.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, and 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

The term "about," as used in this disclosure, can allow for a degree of variability in a value or range, for example, within 10%, within 5%, or within 1% of a stated value or of a stated limit of a range.

As used in this disclosure, the terms "a," "an," and "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

In the methods described in this disclosure, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

As used in the present disclosure, "red mud," "bauxite residue," and "bauxite tailings" can be used interchangeably to refer to mixed-oxide by-products of alumina extraction from bauxite using the Bayer process. The mixed-oxide material can include oxides of elements such as iron, aluminum, and silicon. Such elements can be present in red mud as minerals including, but not limited to, anhydrite, iron titanium oxide, sodalite, cancrinite, aluminous-goethite, hematite, silica, tricalcium aluminate, boehmite, titanium dioxide, perovskite, muscovite, calcium carbonate, gibbsite, and kalinite. For example, an exemplary composition of global red mud includes about 30 wt % to about 60 wt % iron oxide, calculated as $Fe_2O_3$, about 10 wt % to about 20 wt % aluminum oxide, calculated as $Al_2O_3$, about 3 wt % to about 50 wt % silicon oxide, calculated as $SiO_2$, about 2 wt % to about 10 wt % sodium, calculated as $Na_2O$, about 2 wt % to about 8 wt % calcium, calculated as CaO, and about 5 wt % to about 15 wt % titanium, calculated as $TiO_2$. As the composition of red mud can vary depending on its source, "red mud" as used in the present disclosure also includes mixed-oxide by-products that differ from these exemplary ranges.

As used in the present disclosure, "mixed oxide" refers to a material containing oxides of two or more elements. Oxides of a given element in a mixed oxide may be stoichiometric or non-stoichiometric. For example, "silicon oxide" may be present in a mixed-oxide material, at least in part, as $SiO_x$ where x is up to about 2, such as about 1 to about 2. Regardless of oxidation state, the amount of an element present in a mixed oxide material can be calculated based upon a single oxide of the element. For example, the relative amount of calcium oxide present in a mixed-oxide material containing calcium carbonate, cancrinite, tricalcium aluminate, and perovskite can be represented as a weight percentage of CaO.

Embodiments

An embodiment described herein provides a catalyst composition including about 50 wt % to about 99 wt % of a mixed-oxide material including iron oxide, aluminum oxide, and silicon oxide, and about 1 wt % to about 40 wt % of rhodium oxide, calculated as $Rh_2O_3$. In an aspect, the mixed-oxide material includes about 5 wt % to about 60 wt % of iron oxide, calculated as $Fe_2O_3$, about 5 wt % to about 30 wt % of aluminum oxide, calculated as $Al_2O_3$, and about 3 wt % to about 50 wt % of silicon oxide, calculated as $SiO_2$.

In an aspect, the mixed-oxide material further includes at least one of sodium oxide, calcium oxide, and titanium oxide. In an aspect, the mixed-oxide material includes up to about 15 wt % of titanium oxide, calculated as $TiO_2$, up to about 14 wt % of calcium oxide, calculated as CaO, and up to about 10 wt % of sodium oxide, calculated as $Na_2O$.

In an aspect, the mixed-oxide material includes about 30 wt % to about 60 wt % of iron oxide, calculated as $Fe_2O_3$, about 10 wt % to about 20 wt % of aluminum oxide, calculated as $Al_2O_3$, about 3 wt % to about 50 wt % of silicon oxide, calculated as $SiO_2$, about 5 wt % to about 15 wt % of titanium oxide, calculated as $TiO_2$, about 2 wt % to about 8 wt % of calcium oxide, calculated as CaO, and about 2 wt % to about 10 wt % of sodium oxide, calculated as $Na_2O$. In an aspect, the mixed-oxide material includes red mud from a process for extracting alumina from bauxite.

In an aspect, the catalyst composition includes about 5 wt % to about 30 wt % of rhodium oxide. In an aspect, the mixed-oxide material and the rhodium oxide make up at least about 90 wt % of the catalyst composition. In an aspect, the rhodium oxide is supported on the mixed-oxide material.

In an aspect, a Brunauer-Emmett-Teller (BET) surface area of the catalyst composition is at least about 90 $m^2/g$. In an aspect, a BET surface area of the catalyst composition is at least about 125 $m^2/g$. In an aspect, a BET surface area of the catalyst composition is about 125 $m^2/g$ to about 200 $m^2/g$.

An embodiment described herein provides a method for preparing a catalyst composition. The method includes contacting a mixed-oxide material including iron oxide, aluminum oxide, and silicon oxide with an acid to form an acid-treated support, precipitating a mixture of the acid-treated support and rhodium to form a precursor composition, and calcining the precursor composition to form the catalyst composition. In an aspect, the mixed-oxide material includes red mud from a process for extracting alumina from bauxite.

In an aspect, contacting the mixed-oxide material with an acid includes adding the acid to an aqueous solution including the mixed-oxide material. In an aspect, the acid includes hydrochloric acid. In an aspect, contacting the mixed-oxide material with acid forms an acid-treated support having a BET surface area of at least about 140 $m^2/g$.

In an aspect, precipitating the mixture of the acid-treated support and rhodium includes adding a base to an aqueous solution including the acid-treated support and a rhodium salt. In an aspect, the base is ammonia. In an aspect, adding the base to the aqueous solution increases the pH of the solution to greater than about 8. In an aspect, the rhodium salt is rhodium acetylacetonate.

In an aspect, the method further includes filtering the precursor composition, drying the filtered precursor composition, and calcining the dried precursor composition. In an aspect, calcining the precursor composition forms a catalyst composition having a BET surface area of at least about 90 $m^2/g$.

An embodiment described herein provides a method for dry reforming methane. The method includes contacting methane and carbon dioxide with a catalyst composition including about 50 wt % to about 99 wt % of a mixed-oxide material including iron oxide, aluminum oxide, and silicon oxide, and about 1 wt % to about 40 wt % of rhodium oxide, calculated as $Rh_2O_3$, to form $H_2$ and CO. In an aspect, the catalyst composition includes a BET surface area of at least about 90 $m^2/g$. In an aspect, the mixed-oxide material includes red mud from a process for extracting alumina from bauxite.

In an aspect, the method includes contacting methane and carbon dioxide with the catalyst composition at a temperature of about 500° C. to about 1,000° C. In an aspect, the method includes contacting methane and carbon dioxide with the catalyst composition at a pressure of about 5 bar to about 20 bar. In an aspect, the method includes contacting methane and carbon dioxide with the catalyst composition at a gas hourly space velocity (GHSV) of about 1,000 $h^{-1}$ to about 10,000 $h^{-1}$.

Other implementations are also within the scope of the following claims.

What is claimed is:

1. A catalyst composition comprising:
   about 50 wt. % to about 90 wt. % of a mixed-oxide material comprising iron oxide, aluminum oxide, and silicon oxide; and
   about 10 wt % to about 40 wt % of rhodium oxide, calculated as $Rh_2O_3$,
   wherein a Brunauer-Emmett-Teller (BET) surface area of the catalyst composition is at least about 100 $m^2/g$.

2. The catalyst composition of claim 1, wherein the mixed-oxide material comprises:
   about 5 wt % to about 60 wt % of iron oxide, calculated as $Fe_2O_3$;
   about 5 wt % to about 30 wt % of aluminum oxide, calculated as $Al_2O_3$; and
   about 3 wt % to about 50 wt % of silicon oxide, calculated as $SiO_2$.

3. The catalyst composition of claim 1, wherein the mixed-oxide material further comprises at least one of sodium oxide, calcium oxide, and titanium oxide.

4. The catalyst composition of claim 3, wherein the mixed-oxide material comprises:
   up to about 15 wt % of titanium oxide, calculated as $TiO_2$;
   up to about 14 wt % of calcium oxide, calculated as CaO; and
   up to about 10 wt % of sodium oxide, calculated as $Na_2O$.

5. The catalyst composition of claim 1, wherein the mixed-oxide material comprises:
   about 30 wt % to about 60 wt % of iron oxide, calculated as $Fe_2O_3$;
   about 10 wt % to about 20 wt % of aluminum oxide, calculated as $Al_2O_3$;
   about 3 wt % to about 50 wt % of silicon oxide, calculated as $SiO_2$;
   about 5 wt % to about 15 wt % of titanium oxide, calculated as $TiO_2$,
   about 2 wt % to about 8 wt % of calcium oxide, calculated as CaO; and
   about 2 wt % to about 10 wt % of sodium oxide, calculated as $Na_2O$.

6. The catalyst composition of claim 1, wherein the mixed-oxide material comprises red mud from a process for extracting alumina from bauxite.

7. The catalyst composition of claim 1, comprising about 50 wt. % to about 85 wt. % of a mixed-oxide material comprising iron oxide, aluminum oxide, and silicon oxide; and about 15 wt % to about 30 wt. % of rhodium oxide.

8. The catalyst composition of claim 1, wherein the rhodium oxide is supported on the mixed-oxide material.

9. The catalyst composition of claim 1, wherein a BET surface area of the catalyst composition is at least about 125 $m^2/g$.

10. The catalyst composition of claim 1, wherein a BET surface area of the catalyst composition is about 125 $m^2/g$ to about 200 $m^2/g$.

11. A method for preparing the catalyst composition of claim 1, the method comprising:
    contacting a mixed-oxide material comprising iron oxide, aluminum oxide, and silicon oxide with an acid to form an acid-treated support;
    precipitating a mixture of the acid-treated support and rhodium to form a precursor composition; and
    calcining the precursor composition to form the catalyst composition,
    wherein the catalyst composition comprises:
      about 50 wt. % to about 90 wt. % of a mixed-oxide material comprising iron oxide, aluminum oxide, and silicon oxide; and
      about 10 wt % to about 40 wt % of rhodium oxide, calculated as $Rh_2O_3$, and
    wherein a Brunauer-Emmett-Teller (BET) surface area of the catalyst composition is at least about 100 $m^2/g$.

12. The method of claim 11, wherein the mixed-oxide material comprises red mud from a process for extracting alumina from bauxite.

13. The method of claim 11, wherein contacting the mixed-oxide material with an acid comprises adding the acid to an aqueous solution comprising the mixed-oxide material.

14. The method of claim 11, wherein the acid comprises hydrochloric acid.

15. The method of claim 11, wherein contacting the mixed-oxide material with acid forms an acid-treated support comprising a BET surface area of at least about 140 $m^2/g$.

16. The method of claim 11, wherein precipitating the mixture of the acid-treated support and rhodium comprises adding a base to an aqueous solution comprising the acid-treated support and a rhodium salt.

17. The method of claim 16, wherein the base is ammonia.

18. The method of claim 16, wherein adding the base to the aqueous solution increases the pH of the solution to greater than about 8.

19. The method of claim 16, wherein the rhodium salt is rhodium acetylacetonate.

20. The method of claim 11, further comprising:
    filtering the precursor composition;
    drying the filtered precursor composition; and
    calcining the dried precursor composition.

21. A method for dry reforming methane, the method comprising contacting methane and carbon dioxide with the catalyst composition of claim 1 comprising:
    about 50 wt. % to about 90 wt. % of a mixed-oxide material comprising iron oxide, aluminum oxide, and silicon oxide; and
    about 10 wt % to about 40 wt % of rhodium oxide, calculated as $Rh_2O_3$,
      wherein a Brunauer-Emmett-Teller (BET) surface area of the catalyst composition is at least about 100 $m^2/g$;
    to form $H_2$ and CO.

22. The method of claim 21, wherein the mixed-oxide material comprises red mud from a process for extracting alumina from bauxite.

23. The method of claim 21, comprising contacting methane and carbon dioxide with the catalyst composition at a temperature of about 500° C. to about 1,000° C.

24. The method of claim 21, comprising contacting methane and carbon dioxide with the catalyst composition at a pressure of about 5 bar to about 20 bar.

25. The method of claim 21, comprising contacting methane and carbon dioxide with the catalyst composition at a gas hourly space velocity (GHSV) of about 1,000 h$^{-1}$ to about 10,000 h$^{-1}$.

* * * * *

UNITED STATES PATENT AND TRADEMARK OFFICE
CERTIFICATE OF CORRECTION

PATENT NO. : 12,054,389 B2
APPLICATION NO. : 17/670606
DATED : August 6, 2024
INVENTOR(S) : Mohammed A. Albuali et al.

It is certified that error appears in the above-identified patent and that said Letters Patent is hereby corrected as shown below:

In the Claims

In Column 9, Line 21, Claim 1, please replace "50 wt. %" with -- 50 wt % --

In Column 9, Line 21, Claim 1, please replace "90 wt. %" with -- 90 wt % --

In Column 9, Line 54, Claim 5, please replace "$TiO_2$," with -- $TiO_2$; --

In Column 9, Line 63, Claim 7, please replace "50 wt. %" with -- 50 wt % --

In Column 9, Line 63, Claim 7, please replace "85 wt. %" with -- 85 wt % --

In Column 9, Line 65, Claim 7, please replace "30 wt. %" with -- 30 wt % --

In Column 10, Line 17, Claim 11, please replace "50 wt. %" with -- 50 wt % --

In Column 10, Line 17, Claim 11, please replace "90 wt. %" with -- 90 wt % --

In Column 10, Line 53, Claim 21, please replace "50 wt. %" with -- 50 wt % --

In Column 10, Line 53, Claim 21, please replace "90 wt. %" with -- 90 wt % --

Signed and Sealed this
Fifteenth Day of October, 2024

Katherine Kelly Vidal
*Director of the United States Patent and Trademark Office*